United States Patent [19]

Boileau

[11] Patent Number: 4,890,376
[45] Date of Patent: Jan. 2, 1990

[54] METHOD OF ASSEMBLING AND INTERFACING MODULAR DOOR COMPONENTS ON A VEHICLE

[75] Inventor: Daniel E. Boileau, Dearborn Heights, Mich.

[73] Assignee: United Technologies Automotive, Inc., Dearborn, Mich.

[21] Appl. No.: 189,449

[22] Filed: May 2, 1988

Related U.S. Application Data

[62] Division of Ser. No. 97,230, Sep. 15, 1987, Pat. No. 4,766,697.

[51] Int. Cl.$^4$ .............................................. B23P 11/00
[52] U.S. Cl. ....................................... 29/434; 29/464; 49/349; 49/352
[58] Field of Search .................... 29/434, 464; 49/349, 49/352

[56] References Cited

U.S. PATENT DOCUMENTS

| | | | |
|---|---|---|---|
| 1,206,052 | 11/1916 | Terstedt | 49/210 |
| 1,406,142 | 2/1922 | Asbury | 49/352 |
| 1,796,148 | 3/1931 | Greenblatt | 160/102 |
| 2,026,719 | 1/1936 | Westrope | 49/363 |
| 2,556,748 | 6/1951 | Buckley | 280/33.15 |
| 3,325,186 | 6/1967 | Lund | 280/477 |
| 3,679,243 | 7/1972 | Hammerl | 280/511 X |
| 3,909,033 | 9/1975 | Russell, Jr. | 280/477 |
| 3,951,435 | 4/1976 | Greatbach | 280/477 |
| 4,020,593 | 5/1977 | Salomon et al. | 49/352 X |
| 4,143,885 | 3/1979 | Mahosky | 280/477 |
| 4,151,683 | 5/1979 | Narita et al. | 49/502 |
| 4,169,635 | 10/1979 | Szalay et al. | 280/433 X |
| 4,183,548 | 1/1980 | Schneckloth | 280/433 |
| 4,225,149 | 9/1980 | Koopman | 280/477 |
| 4,232,497 | 11/1980 | Meschnig | 52/506 |
| 4,353,185 | 10/1982 | Saigne | 49/351 |
| 4,568,099 | 2/1986 | Celentino | 280/478 B |

FOREIGN PATENT DOCUMENTS 1955213 5/1971 Fed. Rep. of Germany.

Primary Examiner—Mark Rosenbaum
Assistant Examiner—Frances Chin

[57] ABSTRACT

A method of assembling a post-assembly coupling system for interfacing vehicular door components, particular a window regulator, in a modular door panel assembly that does not require the assembler to see or reach the coupling in order to align or engage the coupling. The coupling assembly includes a dog 40 having a spring loaded pin 50 on one panel (e.g., a modular door interior trim panel 1) and a mating slide/receiver 70, having a sloping tray or ramp 72 with "V"-shaped guides 74 which converge to a female mounting hole 71, on the other panel (e.g. the door frame exterior panel 2). After snap assembly of the door panels, the dog and slide/receiver are brought into relative close proximity to each other and then brought together with the slide/receiver then automatically guiding the pin 50 into engagement with the mounting hole, into which it springs, thereby achieving a coupled, driving interface between the components. The pin and mounting hole serve as the power window drive interface between the drive motor mounted on the interior trim panel module and the slide/receiver mounted on the exterior panel door frame module, for driving the drive window up and down. In bringing the pin and receiver together, the window can be manually moved and/or the power drive can be actuated until coupling engagement is achieved.

5 Claims, 3 Drawing Sheets

METHOD OF ASSEMBLING AND INTERFACING MODULAR DOOR COMPONENTS ON A VEHICLE

This is a division of application Ser. No. 097,230 filed on Sept. 15, 1987, now U.S. Pat. No. 4766697.

Cross Reference To Related Patent Application

This application is related to the subject matter disclosed and claimed in U.S. patent application Ser. No. 097555, filed on even date with the parent hereof for "Modular Trim Panel Unit For Motor Vehicle Doors" by Rochford R. Basson, David V. Tinder and George A. Wooldridge filed on even date herewith and assigned to the same assignee, the disclosure of which related application is incorporated herein by reference.

Technical Field

The field of art to which this invention pertains is modular panel assembly, particularly modular automotive door panel assembly with independent, subsequent coupling of modular components, and more specifically interface couplings suitable for interfacing, for example, window drive assemblies within modular door assemblies after the door panel components have been assembled.

Background

It is common for manufacturers of motor vehicles to purchase the components of an automobile from outside manufacturing concerns as a way to reduce production costs. The components may be provided as lower order sub-assemblies which are to be installed in higher order sub-assemblies, which will in turn be installed on an automobile. Doors and the various sub-assemblies making up a door, lend themselves to being supplied at least partially pre-assembled, and such a door is referred to as a modular door assembly.

Typically in the prior art a fully assembled door will have a window, a window regulator device to lift or drive the window up and down within the door frame, and an interior trim panel which aesthetically covers the exterior door frame.

The regulator device which drives the window is typically attached securely to the door frame, then the window is positioned within some guides and then interfaced with the window driving device by a coupling such as a bushing. The installation of the bushing usually requires that an assembler be able to see and reach the bushing in order to properly secure it. Lastly, the interior trim panel is attached to the door frame covering over the window guides, the window driving device and a portion of the window.

Because the bushing must be accessible to an assembler, this precludes attaching the interior trim panel to the door frame before fully installing the window within the door. In addition, there may be physical limitations present in an assembly line which hamper the full installation of the window into the door. For example, the assembly line may be positioned against a wall or laid out in such a manner that the assembler cannot easily gain access to the interior side of a door, making it difficult to view and secure the window to the window drive device easily and quickly.

This interfacing problem has hampered the development of a modular door panel assembly, which would include pre-assembled in the interior trim panel the window drive mechanism. Heretofore, it had been assumed that, in such a modular door assembly, careful and precise alignment of the window drive with the window connector would be necessary in joining the modular door panels together.

DISCLOSURE OF THE INVENTION

Thus, a basic object of this invention is to provide a modular panel assembly with a component interface coupling that does not require an assembler to see or reach the interface coupling in order to assemble the panels, and indeed allows for the automatic coupling of the component interface after the panel components have been assembled and at least generally attached together.

In the preferred, exemplary embodiment, for a modular vehicle door panel assembly, the interface coupling includes a moveable window assembly having a receiver (usually a slide/receiver) mounted within the exterior door panel structure attached to the bottom of the window glass. The slide/receiver has an apex with a female mounting hole, and an attached, external tray or ramp which slopes up toward the mounting hole. The tray and the apex also preferably have "V"-shaped guides that converge upon the mounting hole.

A window drive means which has a moveable dog or block with a pin bore is attached to the interior door "trim" panel and is in proximate apposition to, but typically below the window assembly on a driven track during the assembly operation. The pin bore is sized to receive an interfacing, male drive pin, which has a shank and an engaging end tip sized to be received by the mounting hole on the receiver. An urging means, such as a spring, is provided for resiliently urging the pin away from the dog and toward the slide/receiver.

After the modular door panels have been assembled and at least generally attached together, the dog and the slide/redeiver are moved into juxtaposition by either lowering the window manually and/or by electrically or manually driving the dog/pin, and the tray and apex in combination with the converging guides are adapted to laterally and orthogonally guide the engaging end tip of the pin to the mounting hole, while simultaneously depressing the pin into the dog. Upon axial alignment of the pin with the mounting hole, the urging means causes the engaging end of the pin to be sprung into the mounting hole, completing the operative interfacing of the window assembly to the window drive means, achieving the desired interfacing coupling blindly and remotely, independently of the panel assembly step.

Thus, another object of this invention is to provide a method of assembling and subsequently automatically interfacing and coupling a drive mechanism or other mechanical component within a modular vehicle door assembly which has been assembled together, rendering the interfacing of, for example, the window assembly with the window drive means inaccessible and unviewable within the assembled modular door assembly.

A further object is to mechanically couple two spaced components together, particularly a drive mechanism located within an assembled door panel structure, after the panels have been assembled together, making the components relatively inaccessible, using mechanical guides to automatically guide the components into coupling engagement, as they are moved closer together, until they mate.

The foregoing and other features and advantages of this invention will become more apparent from the following description, drawings and claims.

BEST, EXEMPLARY MODE FOR CARRYING OUT THE INVENTION

Door Panels

Figure 1:
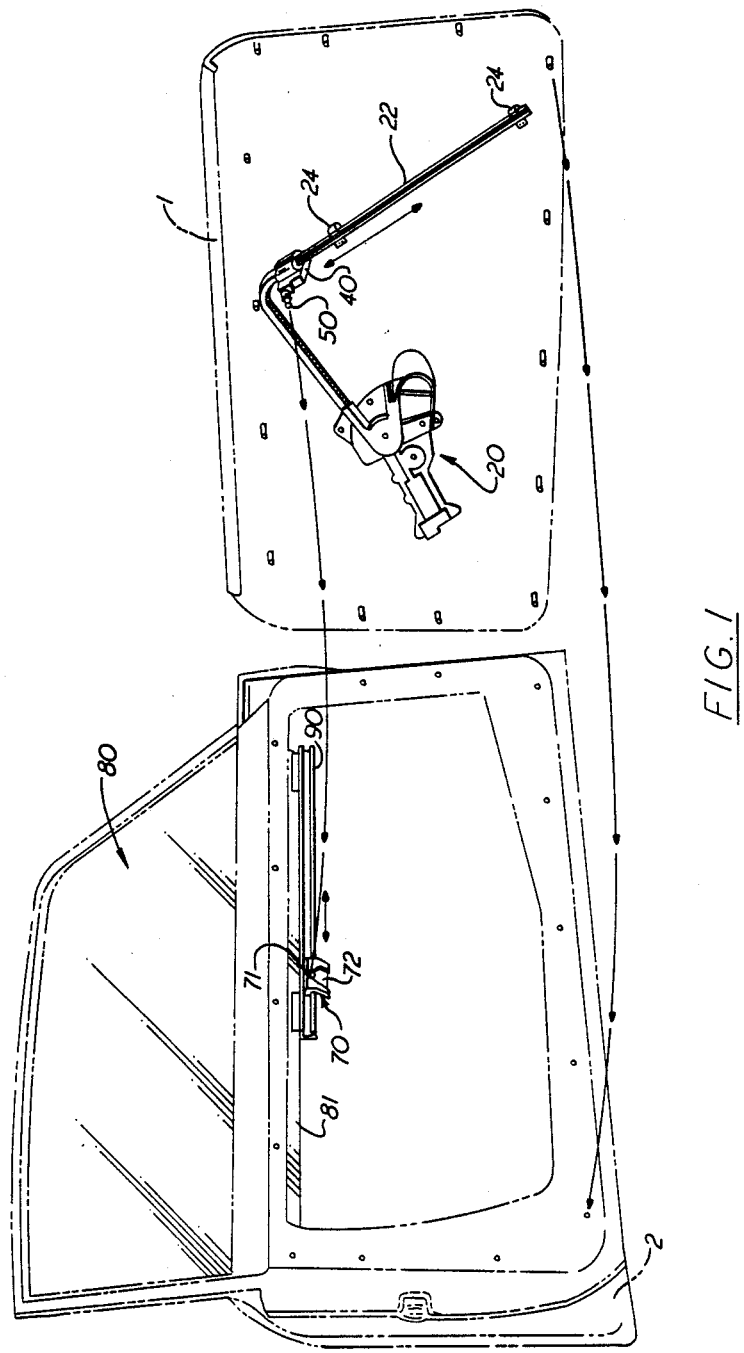
FIG. 1 is a perspective, side view showing the two door panel modules separated but being brought together for the initial attachment of the interior modular door "trim" panel to the exterior structural metal panel for their initial snap-on fit together and thereafter the interfacing coupling of the window drive mechanism to the slide/receiver attached to the window of the vehicle, in accordance with the preferred, exemplary embodiment of the present invention.
Figure 3:
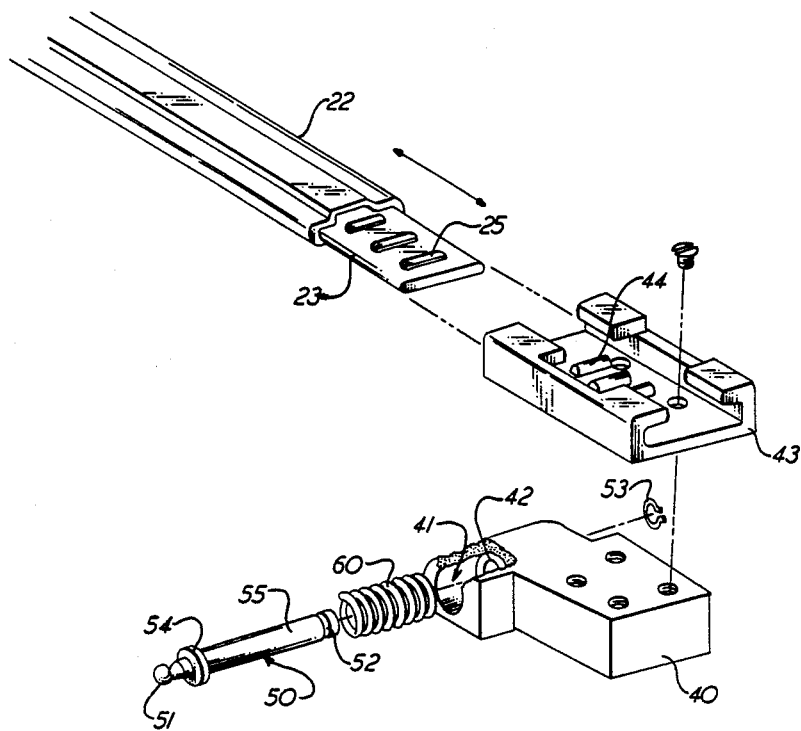
FIG. 3 is an exploded view of the spring biased pin and dog sub-assembly, and the the tape track drive showing the various elements thereof.

As can be seen in FIG. 1, the preferred, exemplary embodiment of the interior door "trim" panel 1 of the present invention includes for the window drive a fixed tape track drive means 20 with a tape track 22 into which is fitted a moveable drive tape 23 (note FIG. 3). A moveable dog block 40 rides on the exterior of the fixed track 22 through guide 43 and is attached to the tape 23 for "to-and-fro" or back and forth or repeatable movement therewith.

When the drive means 20 is actuated by means of an electrical switch (not illustrated), the tape 23 is moved through the tape track 22, causing the dog 40 to be moved up and down along the track, depending upon the direction of drive of the tape track drive means 20. Thus, for example, after the door panels 1, 2 are fully assembled with all of the mechanical components interfaced together, when it is desired to lower the window 80, the electrical switch is appropriately depressed, causing the tape 23 to be driven down within the track 22, pulling the dog 40 down along the track pulling down the attached window.

Exterior metal door frame panel 2 thus includes a window 80, which can be moved up and down within appropriate guides (not illustrated) provided for the window within the exterior door panel. At the lower end 81 of the window 80 a laterally extended channel 90 is provided for connecting the window sub-assembly to the drive mechanism located on the interior door "trim" panel 1 through an interfacing component in the form of a slide/receiver 70. The slide/receiver 70 is free to move laterally within the channel 90.

Figure 2:
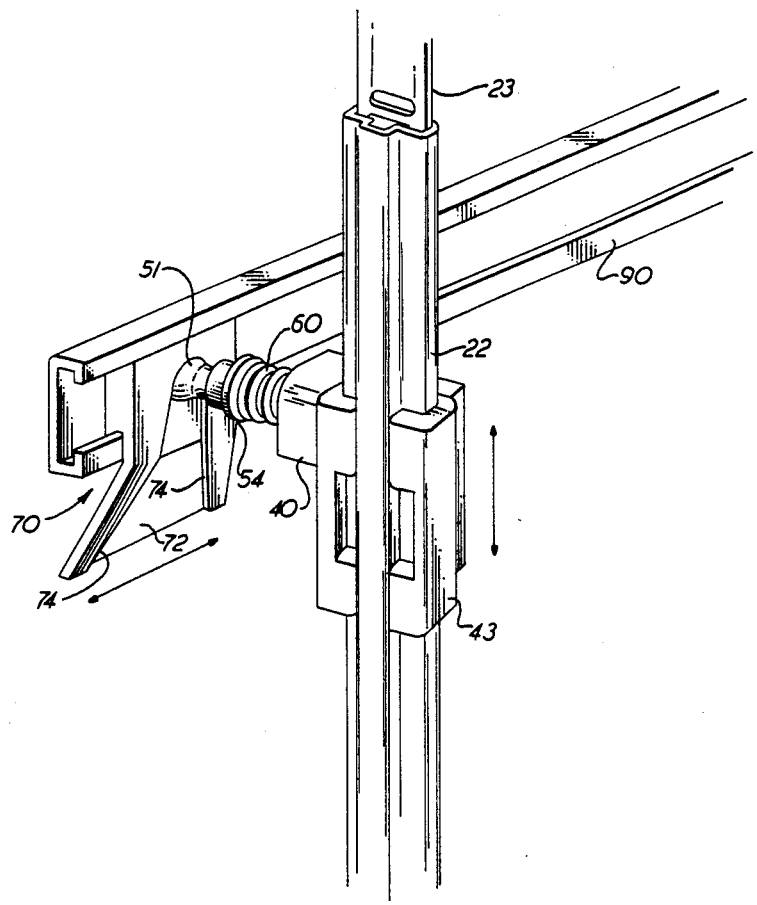
FIG. 2 is a side, perspective, close-up view showing the final coupled interface between the resilient pin on the tape track dog, after it had initially engaged the inclined entry ramp or tray of the slide/receiver, with the pin then having been resiliently pushed back into its chamber against the action of its biasing spring, until ultimately it was positioned over the female opening, into which it has sprung as illustrated for operative driving engagement therewith.

As can best be seen in FIG. 2, the slide/receiver 70 includes an incline ramp 72 flanked by converging "V" guides 74 leading to the apex of the "V" shape. A female opening 71 (note FIG. 1) having a rounded bottom is included coincident with the apex of the ramp or tray 72 and the converging guides 74.

As can best be seen in FIG. 3, the dog 40 includes a spring biased pin 50, which resiliently protrudes out of the dog and has a rounded tip 51. The pin 50 includes on its bottom exterior end a lock ring groove 52, to which is attached on its bottom exterior end a ring lock 53. A compression spring 60 is included in the pin bore 41 surrounding the shank 55 of the pin 50 between the pin shoulder ring 54 and the shoulder surface 42. The lock ring 53 holds the assembled pin elements together against the urging, resilient force of the spring 60.

The body of the dog 40 is attached to guide carriage member 43, which stradles and partially surrounds the track 22 for movement thereover. The guide member 43 and the dog block 40 can be made as an integral unit.

Interior extensions or protrusions 44 fit into mating openings 25 in the moveable track tape 23. Thus, when the track tape 23 is moved within the track 22 under the operation of the drive 20, the mating engagement between the protrusions 44 and the openings 25 cause the dog 40 to be moved along with the track tape 23.

In window drive operation, the rounded tip 51 of the pin 50 fits within the female opening 71 in the slide/receiver 70, it being noted that the slide/receiver 70 can freely laterally move back-and-forth within the channel 90. Thus, even though the track 22 is not aligned in an absolute vertical direction or otherwise directly in line with the direction of travel of the window 80, the window 80 will still travel as directed by its guides. As the dog 40 is moved up and down along the tape track 22, the window 80, which is affixed to the channel 90, is likewise moved up and down.

As noted above, the slide/receiver 70 includes a sloping tray or ramp 72 having a "V"-shaped guide 74 formed on its upper surface, with the apex of the "V" coincident with the female hole 71. As will be explained more fully below, the tray 72 serves to automatically mechanically guide the spring biased pin 50 into the female opening 71, as the two are initially brought together, resulting ultimately in their becoming operatively engaged.

Assembly Procedure

When it is desired to assemble the interior modular door "trim" panel 1 to the external structural metal frame panel 2, the two panels 1, 2 are generally aligned, with the tray 72 having been positioned somewhere above the dog 40, by, for example, manually raising and holding the window 80 in a raised position. The sealing gaskets associated with the window will often hold the window up in its raised position without further support. The two door panels 1, 2 are then pushed together, to form a "snap on" fit (note, for example, set of lower curved direction arrows), at least generally attaching the two together. In this process, it is of course important that the lateral position of the slide/receiver 70 has been located at least generally over the position the dog 40 will occupy, when the two are ultimately brought into juxtaposition, that is, within the effective width of the entry into the tray 72, which can be made to whatever width is practically necessary or desirable.

After the two door panels 1, 2 have been at least generally snapped and attached together, covering over and making the window regulator inaccessible, the pin 50 can be operatively automatically inserted into the female opening 71 by either manually lowering the window 80 until the tray 72 engages the rounded tip 51 of the pin into its "V"-shaped guides 74, ultimately causing the resilient pin to be pushed back into its or bore 41 until the pin 50 comes over the female opening 71, and springs into place. Alternatively or conjunctively, the dog 40 can be driven up by the tape track drive means 20 until the pin 50 reaches the sloping tray 72 and is guided into position by the ramp 72 and the "V"-shaped guide 74 into the opening 71.

Thus, with the foregoing structure and techniques, it is not necessary to precisely align the pin 50 with the female opening 71 in attaching the two door panels 1, 2 together, greatly simplifying the initial assembly operation. Indeed, such coupling is done after the assembly of the panels 1, 2, achieving the interfacing coupling blindly, remotely and automatically.

Alternatively, if desired, the tray or ramp extension 72 associated with the receiver 70 could be put on the opposite side of the receiver body, with the "V" guides 74 positioned upwardly. In this instance, the dog 40 and its pin 50 would be positioned above the receiver 70 with the window lowered, during the initial assembly of the door panel 1, 2. For coupling, the window would be manually pulled up and/or the dog block 40 driven down, until the upwardly extending ramp mechanically guided the drive pin 50 into the hole 71.

As a further alternate, an entry ramp 72 could be included on both sides of the receiver 70, allowing for guided entry of the pin 50 into the opening 71 from either above or below.

It is noted that the principles of the present invention are applicable regardless of the direction of needed coupling movement, which can be orthogonal to the plane of the door as illustrated, or for other component designs planar. The relative movements of the elements to be coupled, as they are brought into coupling engagement, can be either in the vertical direction or the horizontal direction, or in some direction therebetween.

The drive coupling can be for the window lift subsystem, as illustrated, or for some other component; for electrically power driven units or manually driven units; for track window drives or cable window drives or "X" scissor drives or other types of window drives or regulators; etc.

Although this invention has been shown and described with respect to a detailed embodiment thereof, it will be understood by those skilled in the art that various changes in form and detail thereof may be made without departing from the spirit and scope of the claimed invention.

Having thus described a typical embodiment of the invention, that which is claimed as new and desired to be secured by Letters Patent is:

1. A method of assembling and interfacing components of a modular vehicle assembly made up of an exterior door panel, a repeateably moveable assembly positioned for movement within said exterior panel, and a separate interior door panel attachable to said exterior panel, drive means included on said interior panel for repeatably moving said moveable assembly after said panels are attached together, comprising the steps of:
   (a) providing a coupling element on said moveable assembly, a coupling element on said drive means, and a mechanical guide associated with one of said coupling elements for automatically guiding said two coupling elements together into coupling engagement as they are moved toward each other;
   (b) attaching said panels together covering over said coupling elements, while said coupling elements are out of coupling engagement; and
   (c) after at least the initial attachment of said two panels together, moving at least one of said coupling elements toward the other, by actuating said drive means to produce at least in part the relative movement between said coupling elements and using said mechanical guide to automatically bring them into coupling engagement, completing the coupling engagement of said moveable assembly to said drive means after panel assembly without requiring an assembler to see or directly reach the coupling elements in order to achieve the coupling engagement.

2. The method of assembling and subsequently interfacing components of a modular vehicle panel assembly of claim 1, wherein said panels are door panels and said moveable assembly is a door window assembly, wherein there is mounted in step (c), the sub-step of:
   actuating said drive means to produce at least in part said relative movement between said coupling elements.

3. The method of assembling said vehicular door panels and subsequently interfacing the window assembly and its drive means of claim 1, wherein said drive means is electrically powered and wherein there is included the sub-step of electrically powering said drive means to produce at least in part said relative movement between said coupling elements in automatically bringing them into coupling engagement with the use of said mechanical guide.

4. The method of assembling said vehicular door panels and subsequently interfacing the window assembly and its drive means of claim 2, including the further sub-steps of:
   (a-i) providing the window assembly module with a receiver having an inclined ramp associated therewith on at least one side thereof, and lateral guides which converge upon a mounting hole located on the receiver;
   (a-ii) providing the window drive means with a block having a pin bore with a slidingly positioned pin therein, said pin having an engaging end and urging means to urge the pin away from the block and towards the receiver;
   (b-i) pre-positioning said block and receiver prior to assembling the window assembly module to the partially assembled door assembly so as to require the pin to intercept the inclined ramp of the receiver upon subsequent assembling; and
   (c-i) moving the receiver and the block into overlapping proximate apposition within the door panel assembly so that the engaging end of the pin contacts with the inclined ramp and is progressively depressed into the block, the ramp and the converging guides orthogonally and laterally guiding the pin toward the mounting hole until said pin is aligned with and urged into the mounting hole and is captured therein, achieving the desired coupling engagement.

5. The method of assembling said vehicular door panels and subsequently interfacing the window assembly and its drive means of claim 4, wherein sub-step (c-i) further includes the step(s) of:
   (c-ii) operating the window drive means to move the block toward the receiver and the pin up the ramp, and
   (c-iii) holding the window assembly stationary within the door until the pin is captured in the mounting hole.

* * * * *